(12) United States Patent
Benhase et al.

(10) Patent No.: US 7,191,465 B2
(45) Date of Patent: Mar. 13, 2007

(54) METHOD, SYSTEM, AND PROGRAM FOR PROCESSING COMPLEXES TO ACCESS SHARED DEVICES

(75) Inventors: Michael Thomas Benhase, Tucson, AZ (US); John Norbert McCauley, Tuscon, AZ (US); Brian Anthony Rinaldi, Tucson, AZ (US); Micah Robison, Tucson, AZ (US); Todd Charles Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 10/987,571

(22) Filed: Nov. 12, 2004

(65) Prior Publication Data

US 2006/0107308 A1    May 18, 2006

(51) Int. Cl.
*G06F 17/00* (2006.01)
(52) U.S. Cl. .............................. 726/2; 719/319; 707/8
(58) Field of Classification Search ................ 719/319; 707/8; 726/2

See application file for complete search history.

(56) References Cited

OTHER PUBLICATIONS

Image Programming for Scientific Visualization by Cluster Computing; Skala, K.; Sojat, Z.; Autonomic and Autonomous Systems and International Conference on Networking and Services, 2005. ICAS-ICNS 2005. Joint International Conference on Oct. 23-28, 2005 pp. 93-93.*
A parallel processing solution to ESM; Turner, S.P.; Signal Processing for ESM Systems, IEE Colloquium on Apr. 26, 1988 pp. 8/1-8/4.*
Supporting Complex Multi-Dimensional Queries in P2P Systems; Bin Liu; Wang-Chien Lee; Dik Lun Lee; Distributed Computing Systems, 2005. ICDCS 2005. Proceedings. 25th IEEE International Conference on Jun. 6-10, 2005 pp. 155-164.*

* cited by examiner

*Primary Examiner*—David Jung
(74) *Attorney, Agent, or Firm*—David W. Victor; Konrad Raynes & Victor LLP

(57) ABSTRACT

Provided are a method, system and program for processing complexes to access shared devices. A lock to a plurality of shared devices is maintained and accessible to a first and second processing systems. The first processing complex determines a first delay time and the second processing complex determines a second delay time. The first processing complex issues a request for the lock in response to expiration of the first delay time and the second processing complex issues a request for the lock in response to expiration of the second delay time.

36 Claims, 4 Drawing Sheets

METHOD, SYSTEM, AND PROGRAM FOR PROCESSING COMPLEXES TO ACCESS SHARED DEVICES

BACKGROUND OF THE INVENTION

1. Field of the Invention

The present invention relates to a method, system, and program for processing complexes to access shared devices.

2. Description of the Related Art

In certain computing environments, multiple host systems may communicate with a control unit, such as an IBM Enterprise Storage Server (ESS)®, to access data in a storage device managed by the ESS receiving the request. The ESS provides access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit may include duplicate and redundant processing complexes, also known as clusters, to allow for failover to a surviving cluster in case one fails.

Two processing complexes in a control unit may share certain devices, such as adaptors that provide connections to the hosts or storage systems. The processing complexes may communicate with each other to coordinate their sharing of adaptors. In the event that communication is lost between the processing complexes, each processing complex, to the extent possible, will race to obtain a lock to the shared adaptors. The processing complex accessing the lock first will have exclusive access to the shared adaptors and the processing complex losing the race will have access to no adaptors and may go off-line. The lock is held exclusively by the processing complex winning the race to access the lock until communication is reestablished between the processing complexes, at which point the lock is set to a free state where both processing complexes may access the shared adaptors and coordinate their access.

SUMMARY

Provided are a method, system and program for processing complexes to access shared devices. A lock to a plurality of shared devices is maintained and accessible to a first and second processing systems. The first processing complex determines a first delay time and the second processing complex determines a second delay time. The first processing complex issues a request for the lock in response to expiration of the first delay time and the second processing complex issues a request for the lock in response to expiration of the second delay time.

DETAILED DESCRIPTION

Figure 1:
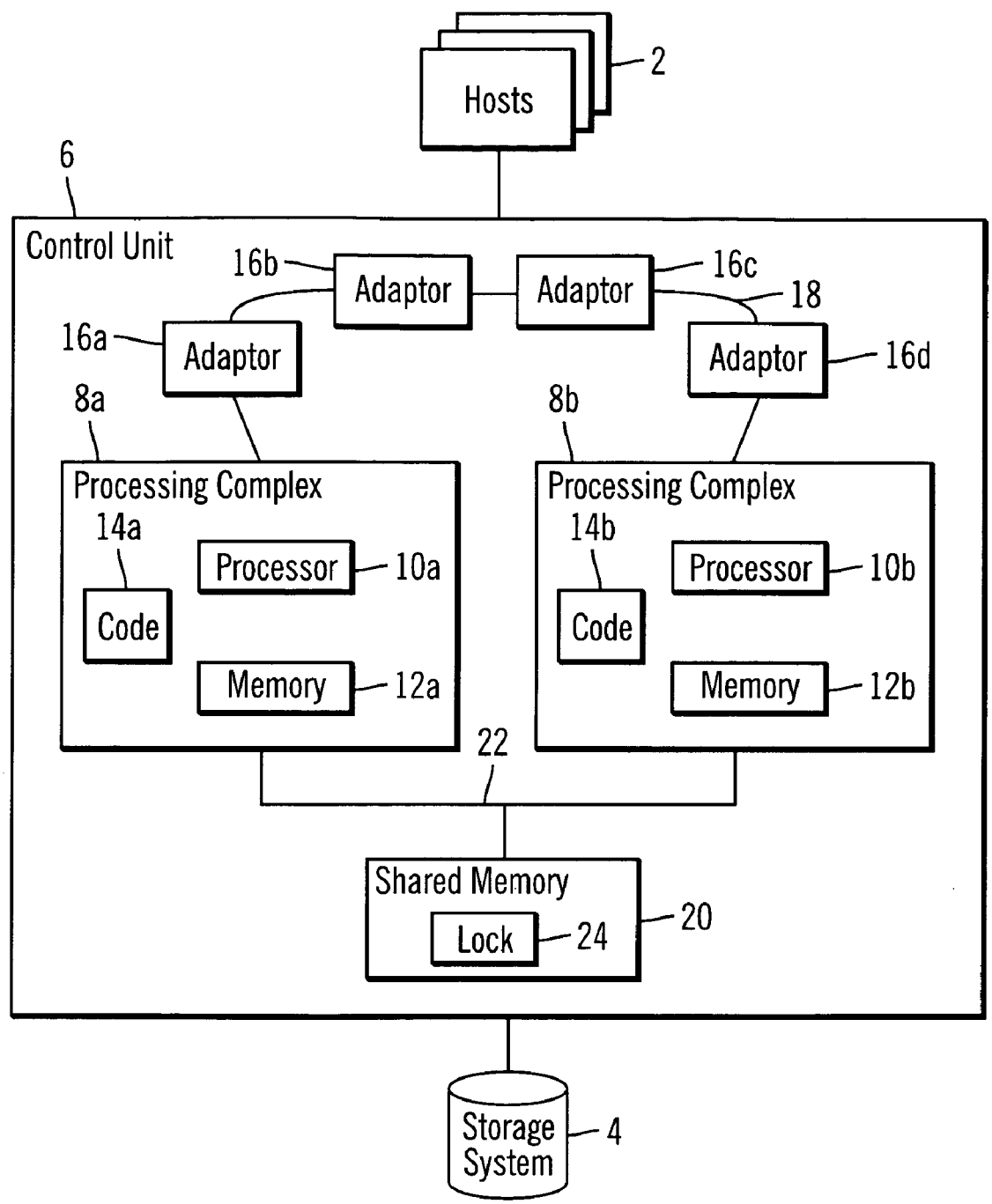
FIG. 1 illustrates a computing environment in which embodiments are implemented.

FIG. 1 illustrates a computing environment in which aspects of the invention are implemented. One or more hosts 2 communicate Input/Output (I/O) requests directed to a storage system 4 to a control unit 6, where the control unit 6 manages access to the storage system 4. In one embodiment, the control unit 6 is comprised of two processing complexes 8a, 8b, such as a Central Electronics Complex (CEC), each including a processor 10a, 10b and a memory 12a, 12b, such as a volatile memory device. The processing complexes 8a, 8b may be on separate power boundaries. The systems 8a, 8b may be assigned to handle I/O requests directed to specific volumes configured in the storage system 4. The systems 8a, 8b communicate with the storage system 4 over a device network (not shown), which may comprise a local area network (LAN), storage area network (SAN), bus interface, serial interface, etc. Each processing complex 10a, 10b executes code 14a, 14b to perform the operations described herein and manage I/O requests.

The processing complexes 8a, 8b share a plurality of devices, such as adaptors 16a, 16b, 16c, 16d, where the processing complexes 8a, 8b and adaptors 16a, 16b, 16c, 16d connect over a loop 18 conforming to suitable loop architectures known in the art. The processing complexes 8a, 8b may communicate with each other and with any of the adaptors 16a, 16b, 16c, 16d connected in the loop 18. In an alternative embodiment, there may be a direct line of communication between the processing complexes 8a, 8b.

The control unit 6 may comprise any type of server, such as an enterprise storage server, storage controller, etc., or other device used to manage I/O requests to attached storage system(s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the control unit 6 over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface.

In one embodiment, the processing complexes 8a, 8b may access a shared memory 20 over a bus interface 22, such as an I²C bus interface. The shared memory 20 includes a lock 24 associated with the adaptors 16a, 16b, 16c, 16d. The lock 24 may be in a free state or an exclusive state owned by one of the processing complexes 8a, 8b. In the free state, the processing complexes 8a, 8b intercommunicate to share access to the shared adaptors 16a, 16b, 16c, 16d. In an exclusive state, only the processing complex 8a, 8b holding the lock 24 may access the shared adaptors 16a, 16b, 16c, 16d.

Figure 2:
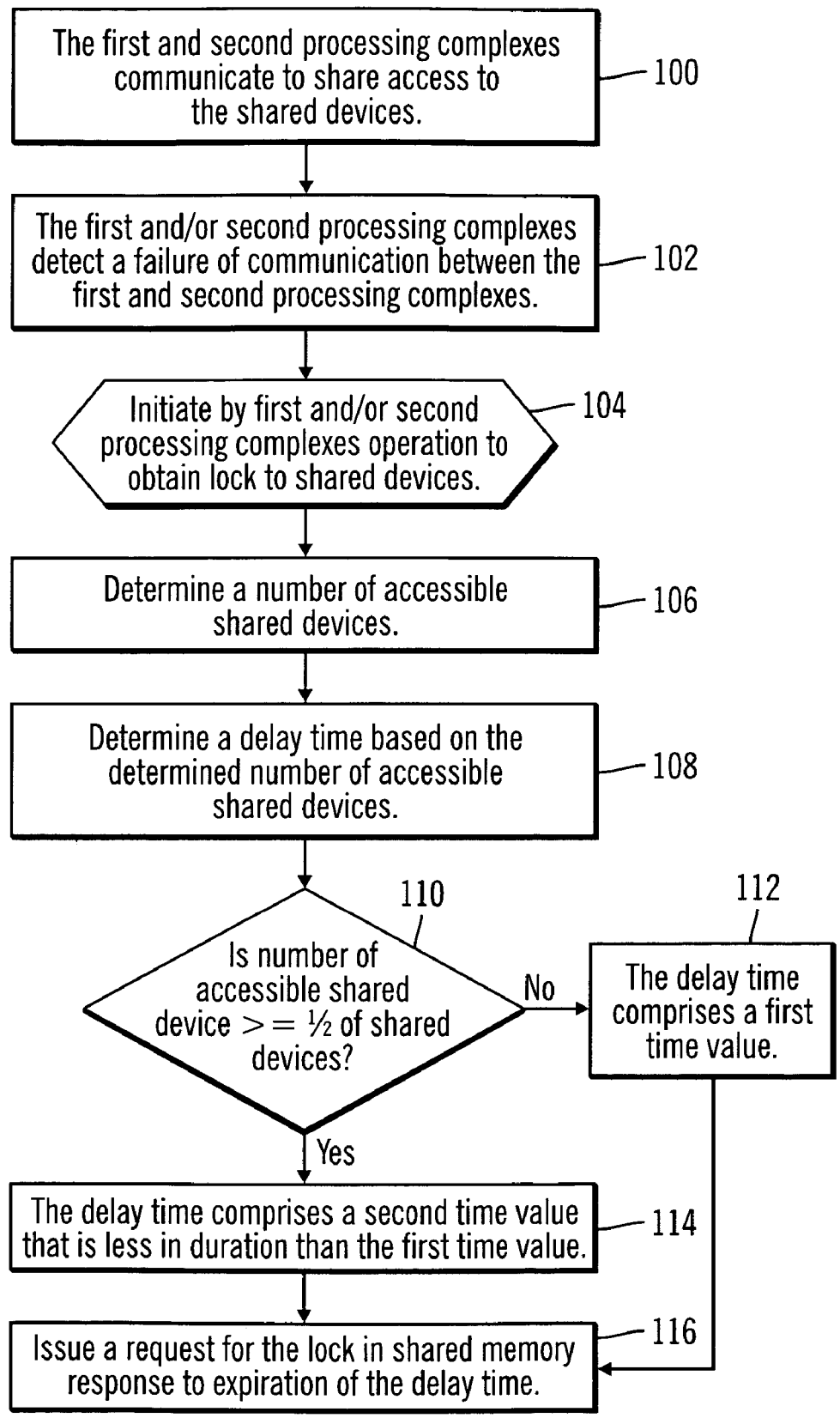
FIGS. 2 and 4 illustrate operations to access a lock to shared devices.

FIG. 2 illustrates operations performed by each available processing complex 8a, 8b executing the code 14a, 14b. During normal operations, the first and second processing complexes 8a, 8b communicate (at block 100) with each other to share access to the shared devices, e.g., adaptors 16a, 16b, 16c, 16d. The processing complexes 8a, 8b communicate with each other and the adaptors 16a, 16b, 16c, 16d over the loop interface 18. Upon detecting (at block 102) a failure of communication between the first and second processing complexes 8a, 8b, any available processing complex 8a, 8b initiates (at block 104) operations to obtain the lock 24 to the shared adaptors 16a, 16b, 16c, 16d. As part of these operations, the available processing complexes 8a, 8b determine (at block 106) a number of accessible shared adaptors 16a, 16b, 16c, 16d that may be accessed over the loop interface 18. For instance, if the loop interface 18 is broken between adaptors 16c and 16d, then processing complex 8a may access three adaptors 16a, 16b, and 16c and processing complex 8b may only access adaptor 16d.

The processing complex 8a, 8b then determines (at block 108) a delay time based on the determined number of accessible shared devices, e.g., adaptors 16a, 16b, 16c, and 16d. In one embodiment, the determined delay time may comprise a first time value (at block 112) if (at block 110) the number of accessible shared devices is less than one-half of all the shared devices, e.g., adaptors 16a, 16b, 16c, 16d, or a second time value (at block 114) if the number of accessible shared devices is equal to or greater than one-half of all the shared devices, where the first time value is greater than the second time value. Each processing complex 8a, 8b may store information on all the shared devices, e.g., adaptors 16a, 16b, 16c, 16d, which were accessible during full functionality, such as when communication was established among the processing complexes 8a, 8b and all adaptors 16a, 16b, 16c, 16d. The available processing complexes 8a, 8b issue (at block 116) a request for the lock 24 in the shared memory 20 in response to expiration of the delay time. The processing complex 8a, 8b obtaining the lock 24 has exclusive access to the shared adaptors 16a, 16b, 16c, 16d, and the losing processing complex 8b in the race for the lock 24 may then go offline until connection is reestablished between the processing complexes 8a, 8b.

With the operations of FIG. 2, if both processing complexes 8a, 8b are simultaneously performing the operations of FIG. 2, then the processing complex 8a, 8b having access to the greatest number of shared devices will access the lock 24 before the processing complex having access to a fewer number of shared devices because the delay time is less for the processing complex having access to a greater number of shared devices. With this embodiment, the processing complex 8a, 8b having access to the greatest number of shared devices will likely obtain the lock 24, thus likely ensuring continued access in the control unit 6 to the greatest number of shared devices. If one processing complex 8a, 8b is not functioning, then the surviving processing complex accesses the lock 24 and takes control of the shared adaptors 16a, 16b, 16c, 16d accessible to the surviving processing complex.

When the operations of FIG. 2 are to a loop 18 configuration such as shown in FIG. 1, only one processing complex may have access to more than half the shared adaptors 16a, 16b, 16c, 16d. For instance, a break in the loop 18 between adaptors 16c and 16d would mean that processing complex 8a has access to three adaptors 16a, 16, 16c and processing complex 8b has access to one adaptor 16d. In such case, processing complex 8a has a shorter delay time, e.g., the second delay time, and would access the lock 24 before processing complex 8b waiting for expiration of the longer first delay time.

Figure 3:
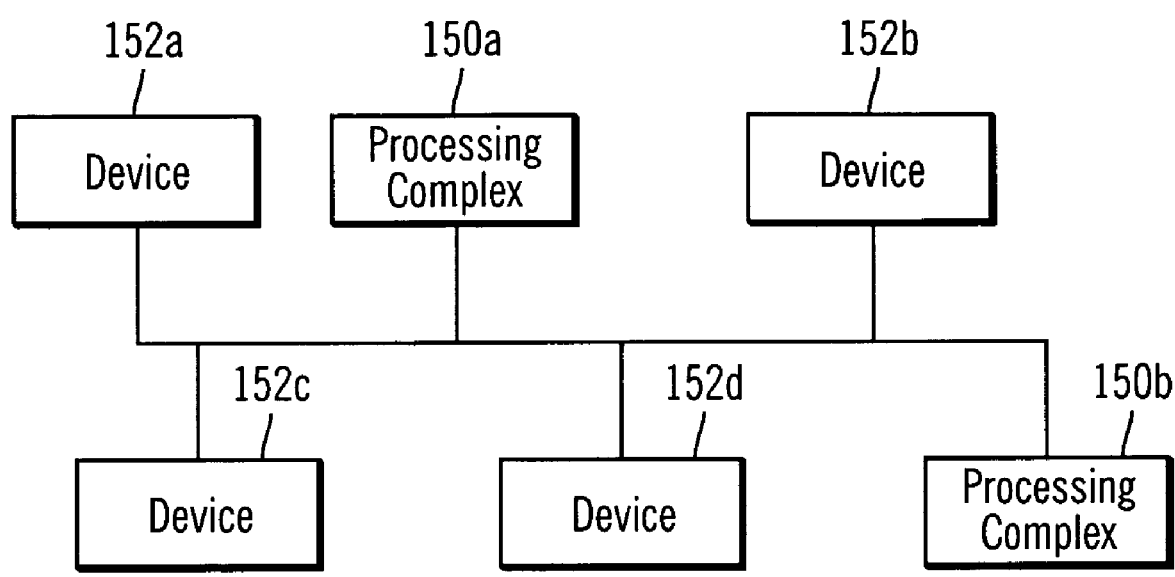
FIG. 3 illustrates a connection among devices and processing complexes.

In additional embodiments, the shared devices, e.g., adaptors 16a, 16b, 16c, 16d, and processing complexes 8a, 8b may be arranged in a configuration other than a loop configuration, such as loop 18 shown in FIG. 1. FIG. 3 illustrates an alternative embodiment where the processing complexes 150a, 150b and shared devices 152a, 152b, 152c, 152d communicate over a bus interface 154. Additional suitable interface configurations may also be used.

Figure 4:
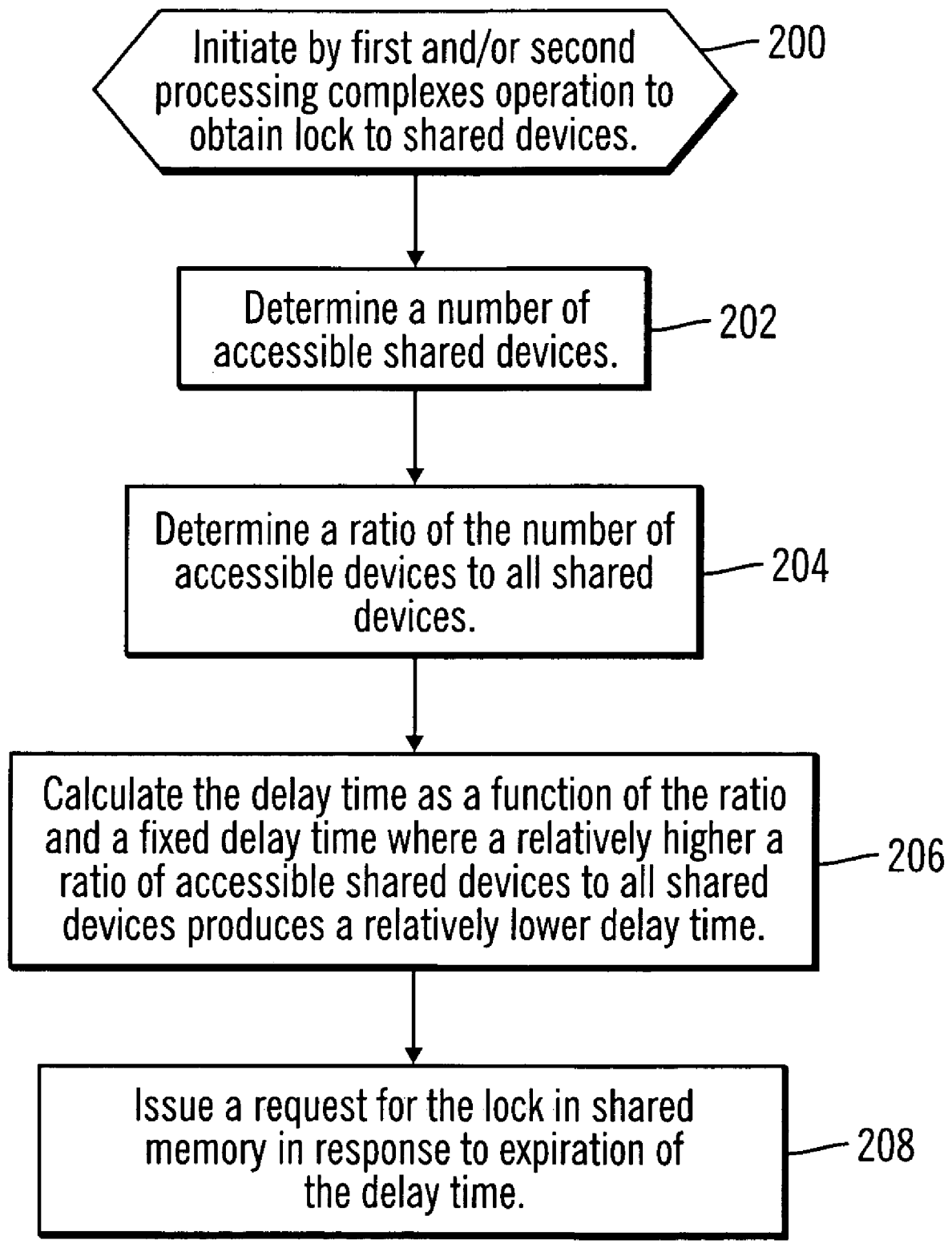

FIG. 4 illustrates an additional embodiment of operations executed by the first and/or second processing complexes 8a, 8b to determine the delay time, which may be initiated by each processing complex 8a, 8b when communication is lost therebetween. Upon a processing complex 8a, 8b initiating (at block 200) an operation to obtain a lock 24 to shared devices, e.g., adaptors 16a, 16b, 16c, 16d, the processing complex 8a, 8b determines (at block 202) a number of accessible shared devices. In this embodiment, the shared devices, e.g., adaptors 16a, 16b, 16c, 16d, may be arranged in a loop configuration such as shown in FIG. 1, a bus configuration as shown in FIG. 3 or other suitable connection configurations known in the art. A ratio of the number of accessible devices to all shared devices is determined (at block 204). Each processing complex 8a, 8b may store information on all the adaptors 16a, 16b, 16c, 16d which were accessible during full functionality, such as when communication was established among the processing complexes 8a, 8b and all adaptors 16a, 16b, 16c, 16d. The processing complex 8a, 8b calculates (at block 206) the delay time as a function of the ratio and a fixed delay time where a relatively higher a ratio of accessible shared devices to all shared devices produces a relatively lower delay time. For instance, equation (1) below may be used to calculate the delay time based on the ratio and fixed delay time:

$$\text{Delay time} = (1 - \text{ratio}) * \text{fixed delay time} \quad (1)$$

The processing complex 8a, 8b calculating the delay time issues a request for the lock 24 in the shared memory 20 in response to expiration of the calculated delay time.

With the embodiment of FIG. 4, there may be many possible delay times that could be calculated based on the total number of shared devices, where the number of possible delay times comprises the number of shared devices plus one, taking into account a maximum delay time when no devices are accessible. Alternatively, in the operations of both FIGS. 2 and 4, a processing complex 8a, 8b not able to access any shared device, e.g., adaptors 16a, 16b, 16c, 16d, may not calculate a delay time and may not pursue the lock 24.

With the operations of FIG. 4 the processing complex 8a, 8b having access to a greatest number of shared devices will likely win the race to access the lock 24 because such processing complex 8a, 8b would have the lowest delay time. Processing complexes 8a, 8b having access to a same number of shared devices would have a same delay time.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, two processing complexes 8a, 8b race for the lock 24 to access the shared devices. In additional embodiments, there may be more than two processing complexes accessing the shared devices.

In one embodiment, the shared devices comprise adaptors 16a, 16b, 16c, 16d that enable the control unit 6 to communicate with hosts 2 and/or a storage system 4. In alternative embodiments, the shared devices may comprise other suitable devices to share between processing complexes.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIGS. 2 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing complex or by distributed processing complexes.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    maintaining a lock to a plurality of shared devices accessible to a first and second processing complexes;
    determining, by the first processing complex, a first delay time;
    determining, by the second processing complex, a second delay time;
    issuing, by the first processing complex, a request for the lock in response to expiration of the first delay time; and
    issuing, by the second processing complex, a request for the lock in response to expiration of the second delay time.

2. The method of claim 1, wherein the first or second processing complex that first obtains the lock is enabled to access the shared devices, and wherein the first or second processing complex that does not first obtain the lock cannot access the shared devices.

3. The method of claim 1, wherein the first and second delay times differ.

4. The method of claim 1, further comprising:
    determining, by the first processing complex, a first number of shared devices accessible to the first processing complex, wherein the first delay time is based on the first number; and
    determining, by the second processing complex, a second number of shared devices accessible to the second processing complex, wherein the second delay time is based on the second number.

5. The method of claim 4, wherein the first and second delay times comprise one of a first time value or second time value, wherein the first or second delay time is determined to be the first time value if the first or second number, respectively, comprises less than half of all shared devices, and wherein the first or second delay time is determined to be the second time value if the first or second number, respectively, is equal to or greater than half of all the shared devices, and wherein the first time value is longer in duration than the second time value.

6. The method of claim 5, wherein the shared devices are connected in a loop configuration between the first and second processing complexes.

7. The method of claim 4, wherein the first delay time is based on a first ratio of the first number to all shared devices and wherein the second delay time is based on a second ratio of the second number to all shared devices.

8. The method of claim 7, wherein the first and second delay times are calculated as a function of the first and second ratios and a fixed delay time, respectively, wherein according to the function a relatively higher a ratio of accessible shared devices to all devices produces a relatively lower delay time.

9. The method of claim 4, further comprising:
    declining, by either the first or second processing complex, to issue the request for the lock in response to determining that no shared devices are accessible.

10. The method of claim 1, further comprising:
    communicating between the first and second processing complexes to share access to the shared devices; and
    detecting, by either the first and/or second processing complexes, a failure of communication between the first and second processing complexes, wherein the operations of determining by the first and/or second processing complexes the first and/or second delay times and issuing the request for the lock are performed by the first and/or second processing complex in response to detecting the failure of communication.

11. The method of claim 1, wherein the first and second processing complexes connect to the shared devices via a first bus interface and wherein the lock is maintained in a shared memory device accessible to both the first and second processing complexes via a second bus interface.

12. A computing environment, comprising:
    a first processing complex;
    a second processing in communication with the first processing complex;
    a plurality of shared devices system accessible to both the first and second processing complexes;
    a computer readable medium accessible to the first and second processing complexes including a lock for the shared devices;
    a first memory including a first program executed by the first processing complex to perform operations comprising:
        (i) determining a first delay time; and
        (ii) issuing a request for the lock in response to expiration of the first delay time; and a second memory including a second program executed by the second processing complex to perform operations comprising:
(i) determining a second delay time; and
(ii) issuing a request for the lock in response to expiration of the second delay time.

13. The computing environment of claim 12, wherein the first or second processing complex that first obtains the lock is enabled to access the shared devices, and wherein the first or second processing complex that does not first obtain the lock cannot access the shared devices.

14. The computing environment of claim 12, wherein the first and second delay times differ.

15. The computing environment of claim 12,
wherein the first program executed by the first processing complex further causes determining a first number of shared devices accessible to the first processing complex, wherein the first delay time is based on the first number; and
wherein the second program executed by the second processing complex further causes determining a second number of shared devices accessible to the second processing complex, wherein the second delay time is based on the second number.

16. The computing environment of claim 15, wherein the first and second delay times comprise one of a first time value or second time value, wherein the first or second delay time is determined to be the first time value if the first or second number, respectively, comprises less than half of all shared devices, and wherein the first or second delay time is determined to be the second time value if the first or second number, respectively, is equal to or greater than half of all the shared devices, and wherein the first time value is longer in duration than the second time value.

17. The computing environment of claim 16, further comprising:
a loop configuration connecting the shared devices between the first and second processing complexes.

18. The computing environment of claim 15, wherein the first delay time is based on a first ratio of the first number to all shared devices and wherein the second delay time is based on a second ratio of the second number to all shared devices.

19. The computing environment of claim 18, wherein the first and second delay times are calculated as a function of the first and second ratios and a fixed delay time, respectively, wherein according to the function a relatively higher a ratio of accessible shared devices to all devices produces a relatively lower delay time.

20. The computing environment of claim 15, wherein the first and second programs executed by the first and second processing complexes, respectively, declines to issue the request for the lock in response to determining that no shared devices are accessible.

21. The computing environment of claim 12, wherein the first and second programs executed by the first and second processing complexes, respectively, further cause operations:
communicating between the first and second processing complexes to share access to the shared devices; and
detecting a failure of communication between the first and second processing complexes, wherein the operations of determining the first and second delay times and issuing the request for the lock are performed in response to detecting the failure of communication.

22. The computing environment of claim 12, further comprising:

a first bus interface connecting the first and second processing complexes to the shared devices; and
a second bus interface connecting the first and second processing complexes to the computer readable medium including the lock to the shared devices.

23. An article of manufacture comprising code executed by a first and second processing complexes, wherein the first and second processing complexes are capable of connecting to a plurality of shared devices and a computer readable medium including a lock for the shared devices, wherein the first and second processing complexes execute the code to perform operations, the operations comprising:
determining, by the first processing complex, a first delay time;
determining, by the second processing complex, a second delay time;
issuing, by the first processing complex, a request for the lock in response to expiration of the first delay time; and
issuing, by the second processing complex, a request for the lock in response to expiration of the second delay time.

24. The article of manufacture of claim 23, wherein the first or second processing complex that first obtains the lock is enabled to access the shared devices, and wherein the first or second processing complex that does not first obtain the lock cannot access the shared devices.

25. The article of manufacture of claim 23, wherein the first and second delay times differ.

26. The article of manufacture of claim 23, wherein the operations further comprise:
determining, by the first processing complex, a first number of shared devices accessible to the first processing complex, wherein the first delay time is based on the first number; and
determining, by the second processing complex, a second number of shared devices accessible to the second processing complex, wherein the second delay time is based on the second number.

27. The article of manufacture of claim 26, wherein the first and second delay times comprise one of a first time value or second time value, wherein the first or second delay time is determined to be the first time value if the first or second number, respectively, comprises less than half of all shared devices, and wherein the first or second delay time is determined to be the second time value if the first or second number, respectively, is equal to or greater than half of all the shared devices, and wherein the first time value is longer in duration than the second time value.

28. The article of manufacture of claim 27, wherein the shared devices are connected in a loop configuration between the first and second processing complexes.

29. The article of manufacture of claim 26, wherein the first delay time is based on a first ratio of the first number to all shared devices and wherein the second delay time is based on a second ratio of the second number to all shared devices.

30. The article of manufacture of claim 29, wherein the first and second delay times are calculated as a function of the first and second ratios and a fixed delay time, respectively, wherein according to the function a relatively higher a ratio of accessible shared devices to all devices produces a relatively lower delay time.

31. The article of manufacture of claim 23, wherein the operations further comprise:

declining, by either the first or second processing complex, to issue the request for the lock in response to determining that no shared devices are accessible.

32. The article of manufacture of claim 23 wherein the operations further comprise:
communicating between the first and second processing complexes to share access to the shared devices; and
detecting, by either the first and/or second processing complexes, a failure of communication between the first and second processing complexes, wherein the operations of determining by the first and/or second processing complexes the first and/or second delay times and issuing the request for the lock are performed by the first and/or second processing complex in response to detecting the failure of communication.

33. The article of manufacture of claim 23 wherein the first and second processing complexes connect to the shared devices via a first bus interface and wherein the lock is maintained in a shared memory device accessible to both the first and second processing complexes via a second bus interface.

34. A method for deploying computing instructions, comprising integrating computer-readable code into a first and second processing complexes, wherein the code in combination with the first and second processing complexes is enabled to cause the first and second processing complexes to perform:
maintaining a lock to a plurality of shared devices accessible to the first and second processing complexes;
determining, by the first processing complex, a first delay time;
determining, by the second processing complex, a second delay time;
issuing, by the first processing complex, a request for the lock in response to expiration of the first delay time; and
issuing, by the second processing complex, a request for the lock in response to expiration of the second delay time.

35. The method of claim 34 wherein the first or second processing complex that first obtains the lock is enabled to access the shared devices, and wherein the first or second processing complex that does not first obtain the lock cannot access the shared devices.

36. The method of claim 34 wherein the first and second delay times differ.

* * * * *